(12) United States Patent
Bokaemper et al.

(10) Patent No.: US 7,376,550 B1
(45) Date of Patent: May 20, 2008

(54) SIMULATION OF NETWORK TRAFFIC USING NON-DETERMINISTIC USER BEHAVIOR MODELS

(75) Inventors: Martin Bokaemper, Munich (DE); Yue Gao, Ottawa (CA); Yong Wang, Kanata (CA); Greg Sidebottom, Ottawa (CA)

(73) Assignee: Juniper Networks, Inc., Sunnyvale, CA (US)

( * ) Notice: Subject to any disclaimer, the term of this patent is extended or adjusted under 35 U.S.C. 154(b) by 373 days.

(21) Appl. No.: 11/258,985

(22) Filed: Oct. 26, 2005

(51) Int. Cl.
*G06F 9/455* (2006.01)
(52) U.S. Cl. .............................. 703/27; 703/22; 703/21; 706/6; 706/19; 706/21; 709/218; 709/224; 709/226; 709/231; 709/232
(58) Field of Classification Search ................. 714/32, 714/43; 717/124, 104; 370/389, 394; 703/21, 703/22
See application file for complete search history.

(56) References Cited

U.S. PATENT DOCUMENTS

| | | | | |
|---|---|---|---|---|
| 6,427,132 | B1* | 7/2002 | Bowman-Amuah | 703/22 |
| 6,487,208 | B1* | 11/2002 | Chirashnya et al. | 370/400 |
| 6,549,882 | B1* | 4/2003 | Chen et al. | 703/21 |
| 6,560,720 | B1* | 5/2003 | Chirashnya et al. | 714/32 |
| 6,601,195 | B1* | 7/2003 | Chirashnya et al. | 714/43 |
| 7,257,082 | B2* | 8/2007 | Dugatkin | 370/235 |
| 2003/0156549 | A1* | 8/2003 | Binder et al. | 370/252 |
| 2004/0190519 | A1* | 9/2004 | Dugatkin | 370/394 |
| 2005/0026130 | A1* | 2/2005 | Crowhurst et al. | 434/362 |
| 2005/0108384 | A1* | 5/2005 | Lambert et al. | 709/224 |
| 2005/0160404 | A1* | 7/2005 | Nachmanson et al. | 717/124 |
| 2006/0083231 | A1* | 4/2006 | Jeffay et al. | 370/389 |
| 2006/0161883 | A1* | 7/2006 | Lubrecht et al. | 717/104 |
| 2006/0161884 | A1* | 7/2006 | Lubrecht et al. | 717/104 |
| 2006/0233111 | A1* | 10/2006 | Wright | 370/241 |
| 2006/0256720 | A1* | 11/2006 | Curran-Gray et al. | 370/235 |

OTHER PUBLICATIONS

Min Xu et al.□□Evaluating Non-deterministic Multi-threaded Commercial Workloads□□Computer Architecture Ecaluation using Commercial Workloads (CAECW-02), Feb. 2002, pp. 1-9.*
David Lee et al.□□Conformance Testing of Protocols Specified as Communicatin FSMs□□IEEE 1993, 0743-166X/93, pp. 115-125.*

* cited by examiner

*Primary Examiner*—Kamini S Shah
*Assistant Examiner*—Cuong V Luu
(74) *Attorney, Agent, or Firm*—Shumaker & Sieffert, P.A

(57) ABSTRACT

A network testing environment includes a control server and a testing cluster composed of one or more load generating devices. The load generating devices output network communications in a non-deterministic manner to model real-world network users and test a network system. The load generating devices operate in accordance with probabilistic state machines distributed by the control server. The probabilistic state machines model patterns of interaction between users and the network system.

40 Claims, 3 Drawing Sheets

SIMULATION OF NETWORK TRAFFIC USING NON-DETERMINISTIC USER BEHAVIOR MODELS

TECHNICAL FIELD

The invention relates to computer networking, and, in particular, to the testing computer networks.

BACKGROUND

Computer networks and network devices have grown increasingly complex and continue to experience increasing loads. This is especially true for network devices connected to the Internet. Networks providing services over the Internet may experience load conditions of millions of concurrent users. Under such circumstances, service providers often require considerable proof that devices and applications will operate correctly when deployed under such conditions.

Traditionally, stress testing of network devices involves generating random packets and sending the packets to the devices. The random packets typically contain no meaningful data, and do not accurately simulate how real users acts. Some network testing tools record sample sequences of user activity and then play the sequences back to the subject device many times. These testing methodologies fall short of actually simulating realistic user activity. For instance, real-world users do not send meaningless packets at regular intervals. Nor do millions of concurrent users merely repeat the same sequence of behavior.

SUMMARY

In general, principles of the invention are directed to techniques for modeling user behavior and generating realistic network communications for testing the performance and scalability of a network system. For example, a testing engineer creates one or more probabilistic state machines to simulate patterns of user behavior. A control server distributes the state machines to a cluster of testing devices. The cluster of testing devices use the probabilistic state machines to generate the network communications in a manner that accurately simulates real-world user behavior.

In one embodiment, the invention is directed to a method that comprises generating a non-deterministic model of a behavior of a network user and generating network communications based on the model to simulate the behavior of the network user and test a network system.

In another embodiment, the invention is directed to a system comprising a network system and a load generating device coupled to the network system via a network. The load generating device outputs network communications based on a non-deterministic behavior model that simulates the behavior of a network user to test the network system.

In another embodiment, the invention is directed to a computer-readable medium containing instructions. The instructions cause a programmable processor to generate a non-deterministic model of a behavior of a network user and to generate network communications based on the model to simulate the behavior of the network user and test a network system.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
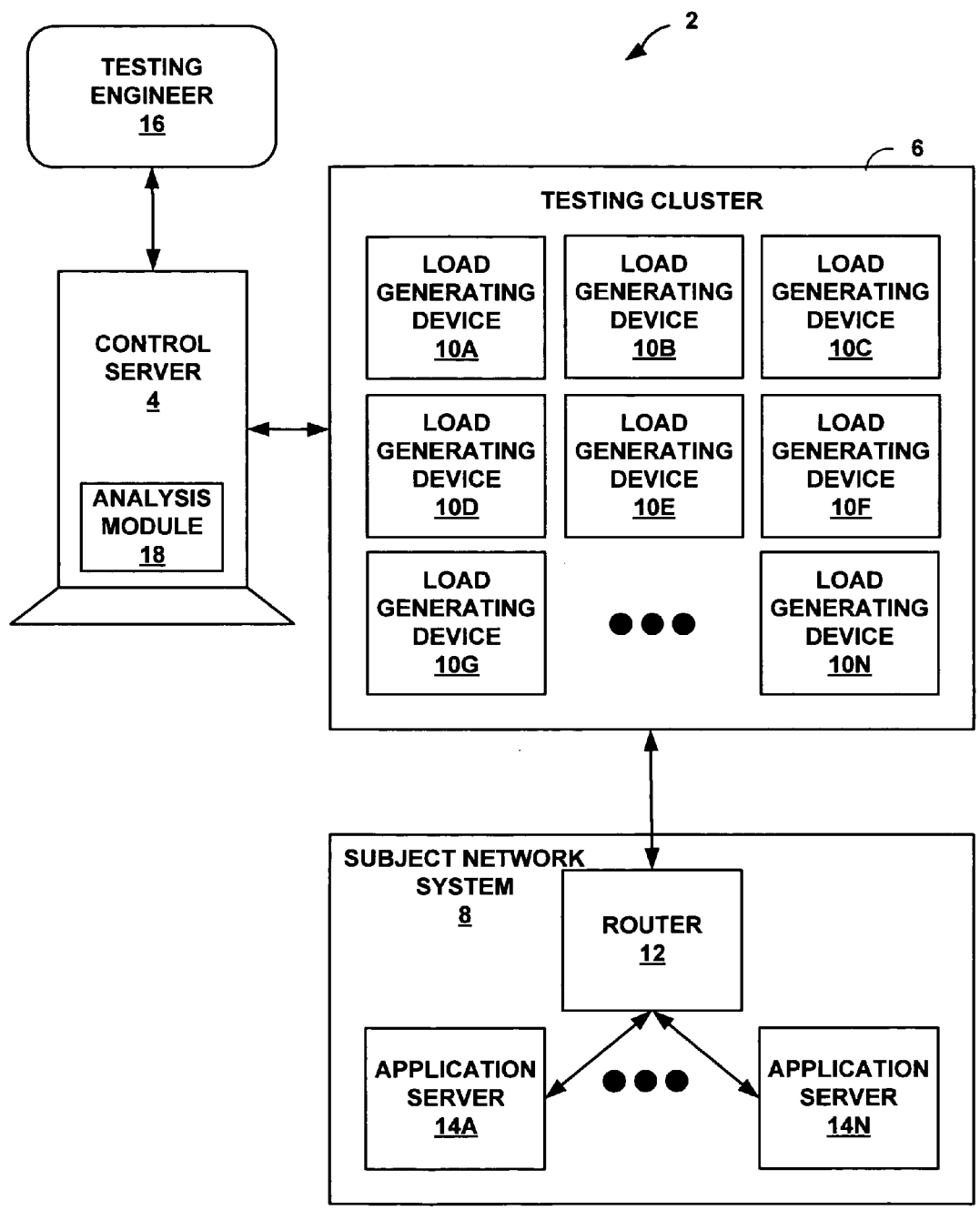
FIG. 1 is a block diagram illustrating an exemplary testing environment that operates in accordance with the principles of this invention.

FIG. 1 is a block diagram illustrating an exemplary testing environment 2 that operates in accordance with the principles of this invention. In this example, testing environment 2 includes a control server 4, a testing cluster 6, and a subject network system 8. Control server 4 includes an analysis module 18. Testing cluster 6 contains a set of one or more load generating devices 10A-10N (collectively, "load generating devices 10"). Network system 8 may be any device or set of devices connected to testing cluster 6 via a network, such that the device or the devices can receive and process network communications and can send network communications. For exemplary purposes, subject network system 8 is shown to contain a router 12 and application servers 14A through 14N (collectively, "application servers 14").

A testing engineer 16 begins a testing process by generating a non-deterministic model of a behavior of a network user. Load generating devices 10 in testing cluster 6 then generate network communications based on the behavior model to simulate the behavior of multiple network users and test network system 8. Testing engineer 16 and/or analysis module 18 may then analyze network communications from network system 8 to verify functionality of the network system.

The model may describe behavior that is realistic for a network user interacting with network system 8 when the network system is deployed in a non-testing environment. For example, the behavior model may specify potential network communications that a network user could send. Because the behavior model is non-deterministic, the behavior model may generate more than one sequence of network communications. For example, the behavior model may specify a delay corresponding to an average time that a user waits before sending the network communication. Further, each node in the behavior model may specify a distribution for how likely and how much the user is likely to deviate from the average time. In this manner, the generated network communication may vary from simulation to simulation.

In some embodiments, the non-deterministic behavior model comprises a probabilistic state machine (PSM) composed of a plurality of nodes interconnected by a set of directed edges. In these embodiments, each of the nodes represents one or more actions that a network user may perform on network system 8. For example, an action might be a Point to Point Protocol (PPP) login to access network system 8. Other example actions include an attempt to send an electronic message (e.g., e-mail, short message service (SMS), or instant message), a dynamic host configuration protocol (DHCP) address acquisition, a hypertext transfer protocol (HTTP) request, a file transfer protocol (FTP) file request, a network ping, a secure sockets layer (SSL) login request, a request sent via a virtual private network, an attempt to send a file to an application server, a request to stream media, a request to print a document, and other network communications.

Further, each node in a PSM may describe an average delay and a distribution of delay. The average delay associated with each node of a PSM specifies an approximate amount of time before a load generating device performs the action associated with the node. This is not a strict time, but rather is a true average. The actual delay may be more or less than the average delay. For instance, if a node of the PSM has an average delay of 600 seconds, one of load generating devices 10 executing the PSM may elect to only wait 500 seconds before performing the action specified by the node.

The delay distribution describes how the distribution of the delay before performing the action varies. For instance, a node could have a delay distribution describing a Poisson distribution. Other example distributions include the Gaussian (normal) distribution, Zipfian distribution, binomial distribution, beta distribution, chi-square distribution, uniform distribution, Pareto distribution, geometric distribution, and other probability distributions. In this manner, load generating devices 22 may more accurately mimic the variability associated with user behavior.

Each directed edge of a PSM represents a transition from a first node of the PSM to a second node of the PSM. In some cases the transition may lead to a different node. In others, the transition may return to the same node of the PSM.

In addition, each directed edge is associated with a specific weight, such that the sum of weights of all directed edges from a first node equals one. In one embodiment, the weight represents the probability that a user performs an action associated with a second node, given the first node. For example, if a node has three outgoing edges A, B, and C, and edge A has weight 0.3, edge B has weigh 0.6, and edge C has weight 0.1, then there is a 30% chance that a transition occurs in accordance with edge A, a 60% chance that a transition occurs in accordance with edge B, and a 10% chance that a transition occurs in accordance with edge C.

Testing engineer 16 tailors each action, average delay, delay distribution, and edge weight to simulate behavior that is realistic for a user interacting with network system 8 when the network system is deployed in a non-testing environment. For example, testing engineer 16 may develop a PSM based on the determination that an average user has a 60% chance of next activating a particular service after successfully completing a PPP login. In addition, testing engineer 16 may determine that the average user might wait 120 seconds before activating that service. Testing engineer 16 may base the behavior model on empirically collected data. Analyzing usage logs from a large enterprise would be a convenient and unobtrusive method of gathering actual user behavior.

After testing engineer 16 has completed designing all of the behavior models (e.g., PSMs), testing engineer 16 may supply the behavior models to control server 4. Control server 4 may then compile each of the behavior models into a series of commands or scripts that load generating devices 10 can process.

In one embodiment, control server 4 supports a "start" command and a "stop" command. The "start" command initiates a simulation. A simulation may be defined by a simulation name, a number of users, and a behavior model. The "simulation name" of the simulation specifies a handle for the simulation that can be used later to stop the simulation and identify sets of results data. The "number of users" of the simulation allows testing engineer 16 to simulate the behavior of multiple concurrent network users by generating network communications based on the behavior model. For instance, if testing engineer 16 invoked the start command with 500,000 as the value of the "number of users" parameter, testing cluster 6 creates network communications in accordance with the supplied behavior model in a manner that simulates the behavior of 500,000 users. The "behavior model" of the simulation specifies the particular behavior model to be used for simulation of real-world user behavior described by testing cluster 6.

Each time testing engineer 16 invokes the "start" command, control server 4 sends a set of simulation instructions to one or more load generating devices 10 in testing cluster 6. The simulation instructions embody a simulation. In other words, the simulation instructions comprise a simulation name, a number of users, and compiled behavior model. Load generating devices 10 follow the simulation instructions to generate network communications on subject network system 8.

Testing engineer 16 may invoke the "start" command multiple times to execute multiple simulations. For example, testing engineer 16 may generate a second non-deterministic model of a behavior of a network user. Testing engineer 16 may then use the "start" command to generate network communications based on the second model to simulate the behavior of a network user concurrently with a first behavior model. Thus, testing engineer 16 could test the performance of subject network system 6 for 10,000 users using a behavior model describing a PPP log-in session while concurrently simulating 60,000 users using a behavior model describing video downloading behavior. Testing engineer 16 may write one or more automated scripts to invoke the "start" command multiple times with respect to various combinations of behavior models and other parameters to perform an overall test set.

When executing in accordance to one or more behavior models, load generating devices 10 in testing cluster 6 may each use thousands of network addresses, and hence load generating devices 10 may use the behavior model to simultaneously simulate the behavior of one or more users. This allows a single load generating device to simulate the effect of thousands of users using different machines. In this way, the load generating devices 10 execute the instructions to generate network communications that simulate the network user.

In some embodiments, load generating devices 10 record information useful in analyzing the functionality of network system 8. For instance, load generating devices 10 might record response network communications from network system 8 and the length of time it takes to receive the response network communications.

The "stop" command of control server 4 ends execution of a simulation and retrieves recorded data from load generating devices 10. In one embodiment, the "stop" command has one parameter, "simulation name," which indicates a simulation to stop. After invoking the "stop" command, analysis module 18 retrieves testing information from load generating devices 10. Analysis module 18 and/or testing engineer 16 may analyze network communications from network system 8 to verify functionality of the network system. Testing engineer 16 may write customized scripts or invoke other software tools or agents in analysis module 18 to perform all or parts of this analysis.

Simulating patterns of user behavior in this manner may have one or more advantages. For instance, when generating network communications to simulate thousands or millions of users, the randomized delays in performing actions may create sudden increases and decreases in activity in a manner that more accurately represents real-world loads. Customization is another potential advantage of testing environment 2. For example, the techniques allow testing engineer 16 to adjust the delays, probabilities and general construction of a behavior model. This may better allow testing engineer 16 to model real-world user behavior. In addition, test engineer 16 may be able to better design network tests that conform to patterns of behavior expected by different classes of potential purchasers of the devices under test. For instance, if the potential purchaser is more interested in testing the functionality and scalability of router 12 than application servers 14, testing engineer 16 can use behavior models that are especially demanding on the router. Alternatively, if the potential customer is interested in testing the functionality and scalability of application servers 14, and router 12 is a load distribution router, testing engineer 16 can use behavior models to test the ability of application servers 14 to handle traffic that is distributed between application servers 14.

Figure 2:
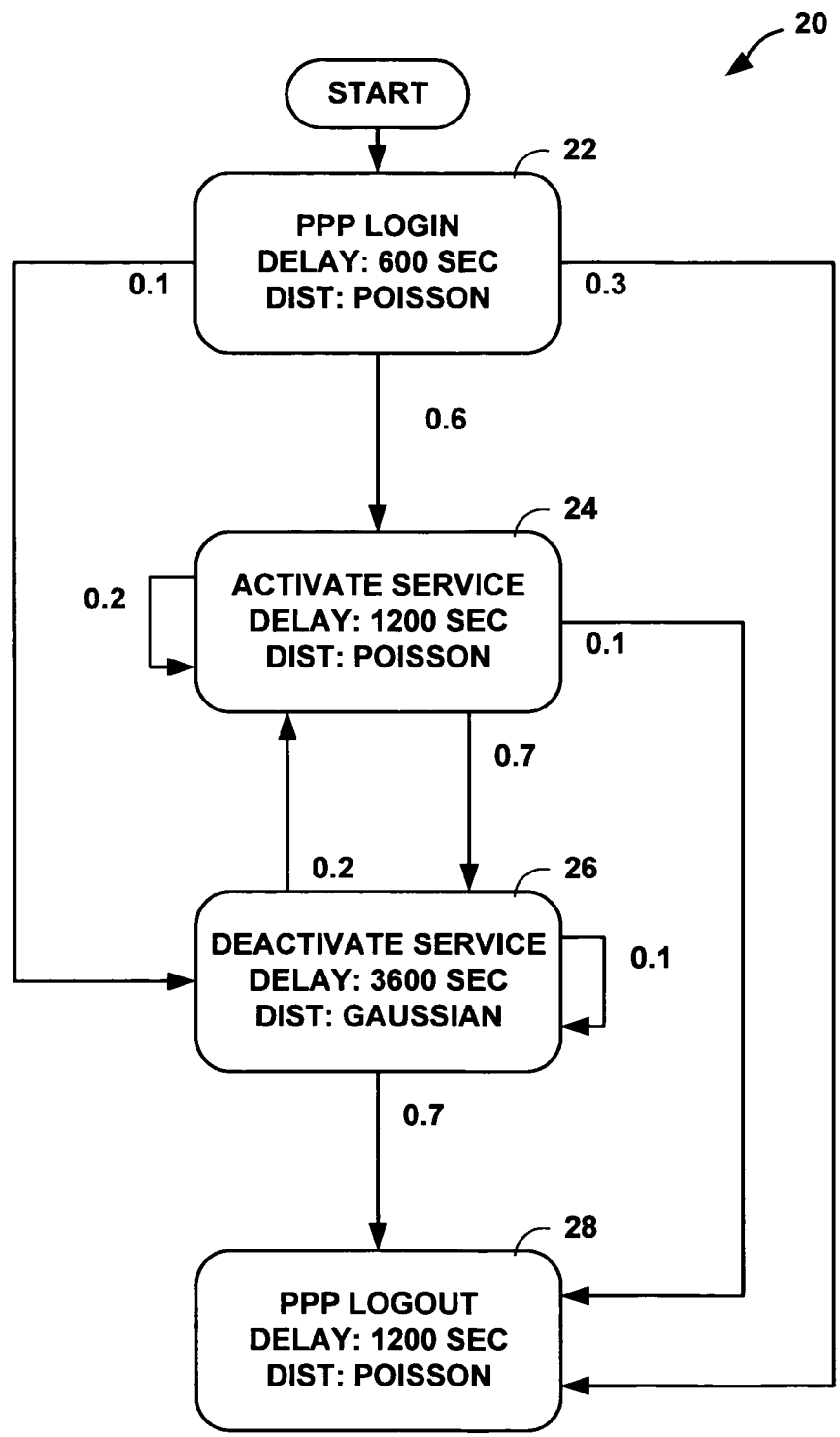
FIG. 2 is a block diagram illustrating an example probabilistic state machine.

FIG. 2 is a block diagram illustrating an exemplary PSM 20. In this example, PSM 20 has four nodes. Each node is a different state of PSM 20. In particular, each node specifies an action, an average delay, and a delay distribution.

A first node 22 serves as the start node of PSM 20. The start node represents the initial state of PSM 20. For example, when load generating device 10A in testing cluster 6 starts executing PSM 20, load generating device 10A waits a duration based on the amount of time specified by node 22. Further, the duration may be based on a distribution for user deviation from the average time. In this example, load generating device 10A waits on average 600 seconds, varied in accordance with a defined Poisson delay distribution. After waiting the duration, load generating device 10A performs the action specified by node 22. As explained above, the action may cause load generating device 10 to send a network communication to network system 8. In this example, the action specified by node 22 is a PPP login.

After executing the action of node 22, load generating device 10A selects a directed edge based on a weight associated with the directed edge. In particular, load generating device 10A selects a directed edge that is a member of a set of directed edges having node 22 as the source node. As shown in FIG. 2, load generating device 10A may transition to one of three states: node 26, node 24, or node 28. There is a 0.1 probability (i.e., 10% chance) that load generating device 10A transfers to node 26, a 0.6 probability that load generating device 10A transfers to node 24, and a 0.3 probability that load generating 10A transitions to node 28. Note that the sum of the probabilities of the edges add to one: 0.1+0.6+0.3=1.0. After selecting an edge, load generating device 10A transitions to an end node of the directed edge.

If load generating device 10A transitions to node 24, load generating device 10A waits on average 1200 seconds and then outputs network communications to simulate the activate service action. For example, the activate service action could be a command to stream video to load generating device 10A. From node 24, there is a 0.7 probability that load generating device 10A transitions to node 26 and a 0.1 probability that load generating device 10A transfers to node 28. In addition, there is a 0.2 probability that load generating device 10A transfers back to node 24. In this case, load generating device 10A again waits on average 1200 seconds and then performs the activate service action.

If load generating device 10A transitions to node 26, load generating device 10A waits on average 3600 seconds before outputting network communications to simulate the deactivate service function. Node 26 differs from nodes 22 and 24 because node 26 uses the Gaussian or normal distribution function instead of the Poisson distribution.

Testing engineer 16 may have any number of reasons to use one distribution as opposed to another. Node 26 also demonstrates that PSM 20 is cyclic. That is, load generating device 10A can transition back to node 24 even if load generating device 10A has previously been in node 24. From node 26, there is a 0.2 probability that load generating device 10A transitions to node 24. In addition, there is a 0.1 probability that load generating device 10A transitions back to node 26 and a 0.7 probability that load generating device 10A transfers to node 28.

Node 28 is a terminal state. That is, node 28 has no outgoing edges. Thus after load generating device 10A waits on average 1200 seconds and performs the PPP logout action, PSM 20 is complete. In the context of testing environment 2, testing engineer 16 may instruct PSM 20 to start over. That is, there may be an additional outgoing edge proceeding from node 28 to node 22 with a probability of 1.

Other PSMs may be substantially more complex than PSM 20. For instance, if subject network system 8 is an electronic commerce server, a single PSM may have hundreds of states that encompass all of the activities that a customer of the server may perform. In addition, the actions associated with each node may be very complex. For example, an action at one node may be to start a Java Applet and send back information through the Java Applet.

Figure 3:
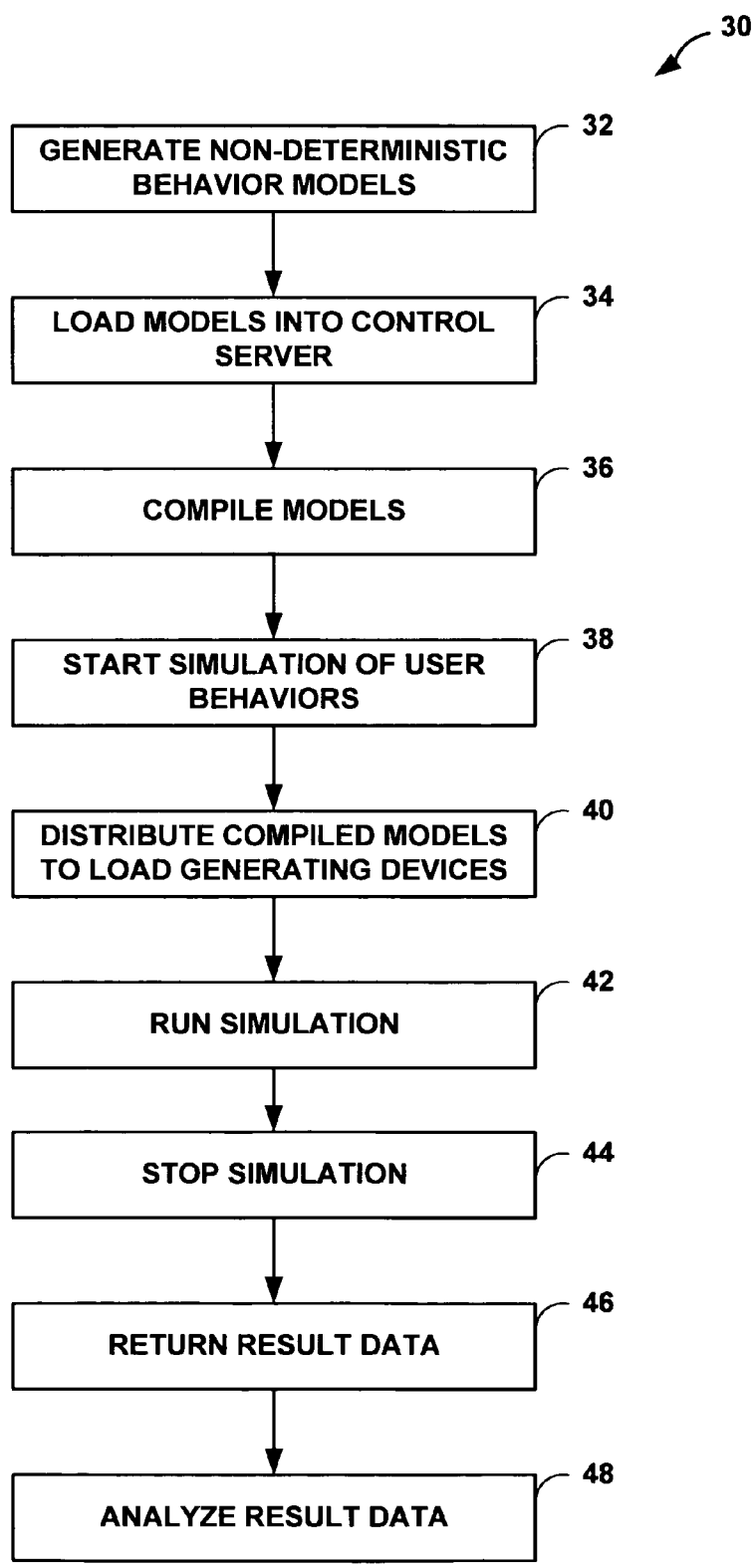
FIG. 3 is a flowchart illustrating exemplary sequence of the testing environment.

FIG. 3 is a flowchart illustrating an example operation of testing environment 2 in accordance with the principles of this invention. A testing process 30 begins when testing engineer 16 generates one or more non-deterministic behavior models of user behavior (32). Generating behavior models may entail creating one or more PSMs that model user behavior. For instance, the process of identifying nodes and assigning delays, distributions, and edge weights is part of generating behavior models of user behavior. After generating the behavior models, testing engineer 16 loads the behavior models into control server 4 (34). In loading the behavior models, control server 4 compiles the behavior models into a series of commands or scripts that can be processed by load generating devices 10 in testing cluster 6 (36).

Next, testing engineer 16 starts a simulation of user behaviors (38). Testing engineer 16 may accomplish this by issuing the "start" command to control server 4 for a behavior models. For example, testing engineer 16 may send a command directing execution of the instructions and specifying a number of users to simulate. Testing engineer 16 may issue the "start" command multiple times to execute multiple simulations concurrently. Starting a simulation causes control server 4 to distribute simulation instructions to testing cluster 6 (40). After the simulation instructions are distributed, load generating devices 10 in testing cluster 6 run the simulation (42). That is, load generating devices 10 executes a behavior model contained in the simulation instructions to simulate the number of concurrent users specified by the simulation instructions.

After running the simulation for a specified period, testing engineer 16 stops the simulation or the simulation may automatically conclude (44). For example, testing engineer 16 or an automated software agent may issue a "stop" command to control server 4 for each simulation previously started. Stopping the simulation causes load generating devices 10 in testing cluster 6 to stop executing the behavior models and return result data to control server 4 (46). After retrieving the result data, analysis module 18 and/or testing engineer 16 may analyze the result data (48). For example, load generating devices 10 may collect actual network communications sent from network system 8 in response to network communications generated based on the behavior model. Analysis module 18 may then analyze the functionality of network system 8 by comparing the actual network communications from the network system with expected network communications from the network system. In another example, load generating devices 10 collect end user perceived response times to network requests from network system 8. Analysis module 18 may then plot cumulative distributions of the end user perceived response times. Analysis module 18 may subsequently use the cumulative distributions to analyze performance of network system 8. For instance, analysis module 18 may determine what fraction of the network requests network system 8 answered within a given time period.

Various embodiments of the invention have been described. These and other embodiments are within the scope of the following claims.

The invention claimed is:

1. A method for simulating behavior of a network user comprising:
    collecting data representing actual user behavior when interacting with a network;
    generating a non-deterministic behavior model of a behavior of a network user, wherein generating a non-deterministic behavior model comprises specifying potential network communications that the network user could send and specifying a non-deterministic delay for each of the network communications, the non-deterministic delay comprising an average time that the user waits before or after generating the network communication and a distribution for how much the user is likely to deviate from the average time, wherein the average time and the distribution being determined based on the collected data; and
    generating and outputting network communications to a network stem based on the generated non-deterministic behavior model to simulate the behavior of the network user and test the network system.

2. The method of claim 1, wherein the behavior model describes behavior that is realistic for a user interacting with a network system when the network system is deployed in a non-testing environment.

3. The method of claim 2, wherein the behavior model is based on empirically collected data.

4. The method of claim 1,
    wherein generating a non-deterministic behavior model comprises generating a state machine having a plurality of nodes interconnected by a set of directed edges,
    wherein each of the nodes represents an action that the user may perform on the network system, and
    wherein each of the directed edges represents a transition from, a first node in the state machine to a second node in the state machine.

5. A method comprising:
    collecting data representing actual user behavior when interacting with a network;
    based on the collected data, generating a non-deterministic behavior model of a behavior of a network user as a state machine having a plurality of nodes interconnected by a set of directed edges, wherein each of the nodes represents an action that the user may perform on the network system, and wherein each of the directed edges represents a transition from a first node in the state machine to a second node in the state machine, and generating and outputting network communications based on the generated non-deterministic behavior model to simulate the behavior of the network user and test a network system,
wherein each node in the plurality of nodes specifies an average amount of time before performing the action associated with the node.

6. The method of claim 5, wherein each node in the plurality of nodes describes a distribution of delay that describes how much the user is likely to deviate from the average time.

7. The method of claim 6, wherein the distribution of delay is a Poisson distribution.

8. The method of claim 7, wherein each of the directed edges is associated with a probability that the user performs an action associated with the second node.

9. The method of claim 5, wherein outputting the network communications comprises:
    waiting a duration based on the average amount of time specified by a first node in the plurality of nodes;
    performing the action specified by the first node;
    selecting a directed edge in the plurality of directed edges based on a weight associated with the directed edge, wherein the directed edge is a member of a set of directed edges having the first node as a source node; and
    transitioning to an end node of the directed edge.

10. The method of claim 9, wherein waiting a duration comprises waiting the duration based on a distribution for user deviation from the average time.

11. The method of claim 9, wherein performing the action comprises sending a network communication to the network system.

12. The method of claim 1, wherein the non-deterministic behavior model generates more than one sequence of network communications.

13. The method of claim 1, further comprising:
    distributing simulation instructions to the load generating devices, wherein the simulation instructions comprise the behavior model and a number of users; and
    executing the simulation instructions to produce the network communications that simulate the behavior for the specified number of users based on the behavior model.

14. The method of claim 13, further comprising compiling the behavior model into a series of commands.

15. The method of claim 13, wherein the specified number equals or exceeds 500,000 users.

16. The method of claim 13, wherein the specified number equals or exceeds 1,000,000 users.

17. The method of claim 1, wherein generating network communications comprises simulating the behavior of multiple concurrent network users by generating network communications based on the behavior model.

18. The method of claim 1, further comprising:
    generating a second non-deterministic model of a behavior of a network user; and
    generating network communications based on the second model to simulate behavior of a network user concurrently with a first model.

19. The method of claim 1, further comprising analyzing network communications from the network system to verify functionality of the network system.

20. The method of claim 19, wherein analyzing network communications comprises:

collecting actual network communications sent from the network system in response to network communications generated based on the model; and comparing the actual network communications from the network system with expected network communications from the network system.

21. The method of claim 19, wherein analyzing network communications comprises:

collecting end user perceived response times to network requests from the network system; and using the response times to analyze performance of the network system.

22. The method of claim 1, wherein the network system is any device or set of devices connected by a network, such that the device or the devices can receive and process network communications and can send network communications.

23. A system comprising:

a network system; and a cluster of testing devices coupled to the network system via a network, wherein the cluster of testing devices outputs network communications based on a non-deterministic behavior model that simulates the behavior of a network user to test the network system, wherein the model specifies a delay for each of the network communications, wherein the delay comprises an average time that the user waits before performing the action and a probability distribution for how the user is likely to deviate from the average time, and wherein the average time and probability distribution is based on collected data representing actual user behavior.

24. The system of claim 23, wherein the model describes behavior that is realistic for a user interacting with a network system when the network system is deployed in a non-testing environment.

25. The method of claim 24, wherein the behavior model is based on empirically collected data.

26. The system of claim 23, wherein the model specifies potential network communications that a network user could send.

27. A system comprising:

a network system; and a cluster of testing devices coupled to the network system via a network, wherein the cluster of testing devices outputs network communications based on a non-deterministic behavior model that simulates the behavior of a network user to test the network system, wherein the model comprises a state machine having a plurality of nodes interconnected by a set of directed edges, wherein, each of the nodes in the plurality of nodes represents an action that the users may perform with respect to the network system given a particular state of the network system, wherein, each of the directed edges represents a transition from a first node in the state machine to a second node in the state machine, wherein each node in the plurality of nodes specifies an average amount of time to wait before performing the action associated with the node, and wherein the average time is based on data representing actual user behavior.

28. The system of claim 27, wherein each node in the plurality of node specifies a distribution for how much the user is likely to deviate from the average time.

29. The system of claim 27, wherein each of the directed edges is associated with a probability that the user performs the action associated with the second node after performing the action associated with the first node.

30. The system of claim 23, wherein the non-deterministic model generates more than one sequence of network communications.

31. The system of claim 23, wherein the control server distributes simulation instructions to the cluster of testing devices, wherein the simulation instructions comprise the behavior model and a number of users; and wherein the cluster of testing devices executes the simulation instructions to produce the network communications that simulate the behavior for the specified number of users based on the behavior model 32. The system of claim 31, wherein the behavior model is compiled into a series of commands that the cluster of testing devices can process.

33. The system of claim 23, wherein the cluster of testing devices simulates the behavior of multiple concurrent network users by generating network communications based on the behavior model.

34. The system of claim 23, wherein the testing cluster of testing devices generates additional network communications based on a second model to simulate behavior of a network user while the cluster of testing devices is also generating the network communications based on a first behavior model.

35. The system of claim 23, further comprising a control server that distributes behavior model to the cluster of testing devices.

36. The system of claim 23, further comprising an analysis module that analyzes network communications from the network system to verify the functionality of the network system.

37. The system of claim 36, wherein the cluster of testing devices collects actual network communications from the network system in response to network communications generated based on the model; and wherein the analysis module compares the actual network communications from the network system with expected network communications from the network system.

38. The system of claim 36, wherein the cluster of testing devices collects end user perceived response times to network requests from the network system; and wherein the analysis module uses the end user perceived response times to analyze performance of the network system.

39. A computer-readable storage medium containing instructions, wherein the instructions cause a programmable processor to:

generate a non-deterministic model of a behavior of a network user, wherein the non-deterministic behavior model specifies potential network communications that a network user could send and a non-deterministic delay for each of the network communications, the non-deterministic delay comprising an average time that the user waits before or after generating the network communication and a distribution for how much the user is likely to deviate from the average time, wherein the average time and distribution are determined from data representing actual user behavior; and generate and output network communications to a network system based on the generated non-deterministic behavior model to simulate the behavior of the network user and test the network system.

40. The method of claim 39, wherein the model describes behavior that is realistic for a user interacting with a network system when the network system is deployed in a non-testing environment.

* * * * *